Nov. 3, 1953     R. E. JACKSON     2,657,728
TIRE CHAIN DEVICE
Filed April 5, 1949

Inventor,
Robert E. Jackson,
by Dike, Calver + Porter
Att'ys.

Patented Nov. 3, 1953

2,657,728

UNITED STATES PATENT OFFICE 2,657,728

TIRE CHAIN DEVICE

Robert E. Jackson, Wellesley, Mass.

Application April 5, 1949, Serial No. 85,575

12 Claims. (Cl. 152—242)

This invention relates to tire chains, such as are ordinarily used on pneumatic tires of automobiles, trucks and busses, to increase traction, and to prevent skidding, particularly upon snowy, icy, or muddy roads.

Many attempts have been made in the past to provide tire-chains, or anti-skid devices, which would be easy to put on and take off, and which at the same time would be effective and practical, as well as inexpensive. All of these attempts have failed and have not found commercial acceptance for one reason or another. Today the only chain device in substantial commercial use with which I am familiar, is the standard set of tire-chains, made and used for many years, which comprises circular side chain members arranged on each side of the tire, connected by cross-links of chains which span the tire tread transversely, and the ends of which chain side members are connected by clamps or catch fasteners with the slack of the side members being taken up by coil-spring fasteners connecting the outside chain side member at intervals crosswise on the outside of the wheel. To put on such a set of tire chains is exceedingly laborious and tedious, requires jacking up the car, and requires the car operator to exert considerable skill, patience and strength and to spend considerable time in the effort. The result is that chains are put on by the average car owner only as a last resort and only in the direst necessity. The only other chain device in substantial commercial use is the set of individual cross-links of chains, which are separately attached at intervals to span the periphery of the tire transversely and extend through slots provided through the rim of the wheel. These links do not require the car to be jacked up, but otherwise are about as difficult to put on as the set of tire-chains previously described.

I have accordingly sought to devise a tire-chain device which can be easily and quickly put on and taken off a tire, and which would be entirely practical for its intended purpose, as well as inexpenseive. I have sought to eliminite and overcome the many difficulties involved in mounting the chain device on the wheel, and in taking it off, which have prevented previous devices from being successful. I have therefore devised a tire-chain mechanism which is exceedingly simple in its construction, which does not require the car to be jacked up, and which can be put on a tire in a minute's time, and which does not require great strength or fine adjustment for proper fitting and which is as effective in its anti-skid qualities as the present standard set of tire chains. Briefly my device comprises a pair of rigid arcuate side members adapted to be disposed on opposite sides of the tire, each of said pair of side members being pivotally connected intermediate their ends, and which side members carry a plurality of chain cross-links at spaced intervals thereon. The two sets of side members terminate short of a full circle, and the inner set is connected at its free ends by a third and separate member preferably a rigid arcuate segment which completes the circular band and has slots in its ends which engage pins or finger hooks carried on the free ends of the pivoted side members. This third member is such that it can readily be attached, and requires no fine or accurate adjustment to make the connection. The outer set of side members are preferably connected by a resilient connecting member, which tensions and takes up the slack in the entire device, causing it to grip the wheel and tire tightly. At the same time the outer set of side members may be additionally reinforced at their free ends by a rigid or flexible link, such as a chain. The spacing of the chain cross-links is such that the car does not need to be jacked up to place the device on the tire. The pivotal connection or joint in each set of side members permits the chain cross-links to be spaced and adjusted to proper fit when placing the device on the tire, and helps to provide the necessary slack in easily connecting the inner and outer side members, and the rigid connecting segment permits the free ends of the inner set of side members to be readily connected by the sense of touch, whil reaching slightly around the tire with the hands and while in a kneeling or squatting position. This ready accessibility to each hand of the free ends of the inner set of side members and in connecting them by a separate member is an important advantage of my device. The resilient connecting link for the outer set of side members then permits the slack in the entire device to be readily taken up and the finger hooks to fully engage when properly arranged in position on the tire. The entire operation takes less than a minute, and the device can be as readily removed. My device is likewise almost as readily placed on tires having low-hanging aprons extending over the tire, as commonly found on the stream-lined cars of modern design, as those without such aprons—which is a practical impossibility with previous devices of this nature. When not in use, my device folds flat and occupies very little space.

My tire-chain is also so constructed that it accommodates a tire in various stages of wear, and will fit a worn tire as well as a new one.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
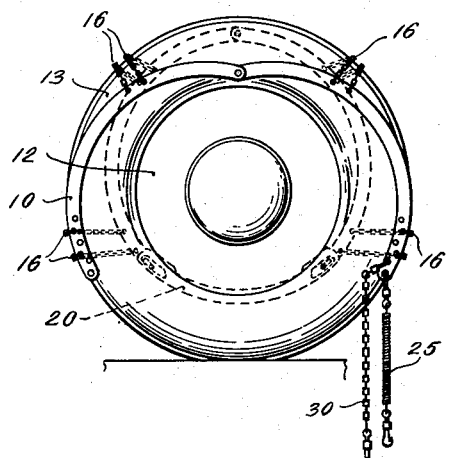
Fig. 1 is a front or outside view of my device with parts in dotted lines, showing how it is placed on a tire.
Figure 2:
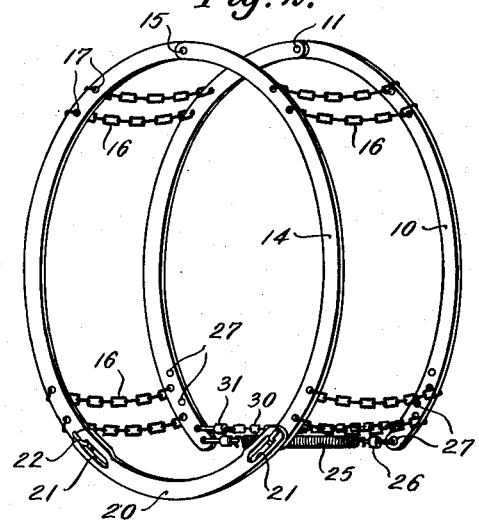
Fig. 2 is a perspective view of my device as seen from the inside, before mounting on a tire.
Figure 3:
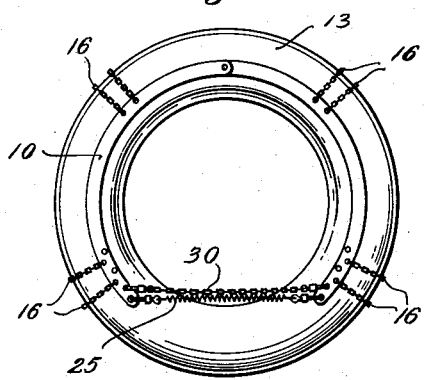
Fig. 3 is a view of my device as mounted on a tire and seen from the outside.
Figure 4:
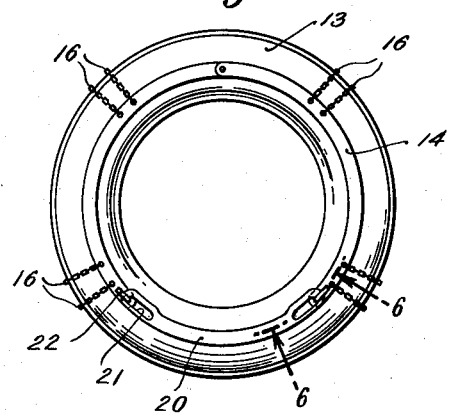
Fig. 4 is a view similar to Fig. 3, but seen from the inside of the tire.

In the drawings 10 represents two rigid arcuate side members, preferably made of steel or other suitable metal, which are pivotally connected at their adjacent ends by means of the pin 11. The two members 10 thus connected constitute the outer pair of side members disposed on the outside of the wheel 12 carrying the tire 13. A second set of rigid arcuate side members 14, again pivotally connected at their adjacent ends by the pin 15, constitute the second and complementary set of side members which are disposed on the inside of the wheel 12. It will be noted that the two sets of inner and outer arcuate side members 10 and 14 terminate short of a full circle. While in the drawings both sets of side members 10 and 14 are shown as identical in length, this is not necessary, and the outer set 10 particularly may be made longer so that their free ends come close together. The two sets of rigid arcuate side members 10 and 14 are then connected by a plurality of cross-link chains 16 or other suitable anti-skid links, which are joined to holes 17 formed in the side members 10 and 14 respectively, and thus span the tread surface of the tire transversely. As shown in the drawings, four sets of chain cross links 16 are shown equally spaced apart on the side members 10 and 14, but it is understood that additional sets of chains may be provided if desired. It is important, however, that the cross-links 16 should not be placed so close to their pivot points 11 and 15 as to interfere with the spreading of outer side members 10, while fitting the device on the tire. At the same time each set of cross link chains 16 are shown to comprise two chains, but it will be readily understood that any suitable number of such chains may be provided in a set as desired. The chains 16 are preferably permanently connected to the sides and are normally replaceable only when worn out. As stated, the inner set of arcuate side members 14 terminate short of a full circle, and as shown, the free ends are spaced apart from one another on the order of a distance about one-quarter of their entire circumference around the side of the tire. The precise distance is immaterial, but it is important that the ends be spaced sufficiently wide apart to permit the easy and ready placement on the ends thereof of the separate rigid connecting segment 20. The connecting segment 20 is preferably rigid and arcuate in shape, and on the same radius as the arcuate members 14, and carries at its ends two longitudinally extending slots 21 which fit over and engage pins or finger hooks 22 mounted on the free ends of arcuate members 14. The fit is preferably easy and relatively loose. The termination of the free ends of arcuate members 14 substantially short of a full circle, thus leaves the ends close to the lower right and left hand tread surfaces of the tire, as shown more particularly in Fig. 1, and permits the operator, while kneeling or squatting on the outside side of the tire, to readily find the ends with his hands, and to connect them with the connecting segment 20 whose slots 21 are readily fitted over the finger hooks 22 previously mentioned, while reaching slightly around the tire, first with one hand then the other. The closer together that the free ends of the segments 14 are, the more difficult it is, of course, to connect up the two ends with the connecting segment 20, and of course it is highly desirable that this be possible to be done in the dark, or by the sense of touch alone. My device is mounted on a tire without jacking up the car, by holding the two sets of arcuate members 10 and 14 parallel with their pivot points 11 and 15 upwardly and lifting the inside set of arcuate members 14 up and over the tire. After thus mounting the device on the tire the bottom free ends of the inner set of arcuate members 14 are brought nearer together by spreading apart the free ends of the outside set of arcuate members 10 which action provides ample slack at the free ends of the arcuate members 14 to permit connecting them by the segment 20, as previously described and as shown in Figure 1. This action is made possible by pivot pins 11 and 15 and transverse links acting as fulcrum points. If the sets of cross links 16 tend to stick or bind on the tire, they are readily disengaged and adjusted merely by pushing downwardly on the outer set of arcuate members at their pivot point 11, which thus spreads and loosens the chains 16 on the tire. As an alternative, it is possible to have one end of segment 20 permanently pivoted or connected to an end of an arcuate side member 14, but as this conceivably may get in the way, and make it more difficult to mount my device on the tire, it is preferable that it be wholly detachable. At the same time, it is preferable, for ease of attachment, that segment 20 be rigid, rather than flexible, or resilient, and that it be arcuate to complete the circle around the tire, so as not to interfere with the shock-absorbers, brake rods and the like, on the ordinary automobile.

Figures 7, 8:
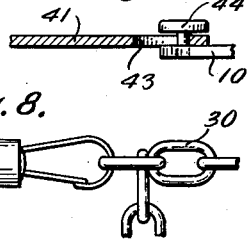
Fig. 7 is a section on line 7—7 of Fig. 5.
Fig. 8 is an enlarged view of a chain connection for the outer set of side members.

After the inner set of side members 14 have been connected by the connecting segment 20, and positioned on the tire the outer set of arcuate side members 10 are also readily connected. For this purpose, a resilient link 25 is preferably provided, which comprises a coil spring central portion with snap fasteners 26 of any suitable design at the two ends, which engage holes 27 provided in the free ends of the outer set of arcuate side members 10. With the inner and outer arcuate side members 14 and 10 properly positioned on the wheel and tire, and segment 20 attached to and connecting the free ends of the inner set of side members 14, the free ends of the outer set of arcuate side members 10 are drawn together as closely as possible with the hands, and are then connected by the resilient fastener 25 previously described by inserting the snap fasteners or catches 26 in the holes 27 in the free ends of the arcuate members 10. To permit a snug fit and to accommodate the wearing of a tire, two or more sets of holes 27 may be provided in the free ends of the arcuate members 10. For an additional safety factor, and to reinforce the resilient connection 25, in case of breakage, a second connection may be provided, and thus may be rigid, flexible, or resilient. In the drawings this additional, or auxiliary connection is shown as a flexible chain 30 also used to connect the free ends of the arcuate side members 10, by means of snap fasteners 31 (similar to snap fasteners 26) and as shown in more detail in Fig. 8.

It will be understood that my tire-chain device is designed to fit on a particular size of wheel and tire, and that for other sizes, the size of my device is changed similarly.

Figure 5:
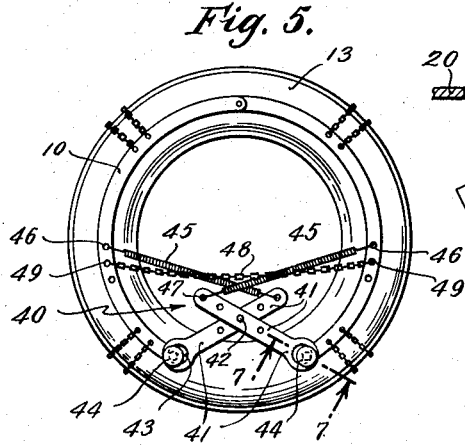
Fig. 5 is a view similar to Fig. 3, but showing a modification.
Figure 6:
Fig. 6 is a section on line 6—6 of Fig. 4.

In Fig. 5 a modification of my device as shown in which a toggle joint 40 having cross arms 41 is shown, which arms are pivoted intermediate their ends at 42 and have enlarged holes 43 which fit over and engage pins 44 provided on the free ends of outer arcuate members 10. It will be understood that the toggle joint 40 is operated by fitting the holes 43 over the pins 44, and then by pulling the opposite ends of the arms 41 together will at the same time draw the free ends of the arcuate members 10 together. The toggle joint 40 is then held resiliently by means of connecting springs 45 substantially similar to resilient connection 25, which again engage a hole 46 provided in the rim of the outer member 10 and another hole 47 in the outer end of the toggle 40. Likewise an auxiliary reinforcing chain 48 may also be provided to connect the ends of arcuate members through holes 49 provided therein, as shown in Fig. 5.

It will thus be seen that I have provided a tire chain device which can quickly be placed on and taken off a tire, without jacking up the car, and without the expenditure of great effort. At the same time the device is simple in construction, and can be inexpensively made, and avoids the objectionable features which have made previous devices, which have sought to solve this problem, impractical and unsaleable.

I claim:

1. A tire chain device comprising a pair of inner and outer rigid arcuate side members adapted to be disposed on opposite sides of a tire, and carrying a plurality of chain cross-links adapted to span the tread of the tire transversely, each set of arcuate side members comprising two sections pivotally connected at adjacent ends and terminating short of a full circle, a rigid segment for connecting the free ends of said inner set of side members, and a resilient link for connecting the free ends of said outer set of side members, said segment and resilient link carrying no chain cross-links.

2. A tire chain device comprising a pair of inner and outer rigid arcuate side members adapted to be disposed on opposite sides of a tire, and carrying a plurality of chain cross-links adapted to span the tread of the tire transversely, each set of arcuate side members comprising two sections pivotally connected at adjacent ends and terminating short of a full circle, a detachable rigid segment for connecting the free ends of said inner set of side members, and a resilient link for connecting the free ends of said outer set of side members, said segment and resilient link carrying no chain cross-links.

3. A tire chain device comprising a pair of inner and outer rigid arcuate side members adapted to be disposed on opposite sides of a tire, and carrying a plurality of chain cross-links adapted to span the tread of the tire transversely, each set of arcuate side members comprising two sections pivotally connected at adjacent ends and terminating short of a full circle, a detachable, rigid, and arcuate segment for connecting the free ends of said inner set of side members, and a resilient link for connecting the free ends of said outer set of side members, said segment and resilient link carrying no chain cross-links.

4. A tire chain device comprising a pair of inner and outer rigid arcuate side members adapted to be disposed on opposite sides of a tire, and carrying a plurality of chain cross-links adapted to span the tread of the tire transversely, each set of arcuate side members comprising two sections pivotally connected at adjacent ends and terminating short of a full circle, a detachable rigid segment for connecting the free ends of said inner set of side members, and a detachable resilient link for connecting the free ends of said outer set of side members, said segment and resilient link carrying no chain cross-links.

5. A tire chain device comprising a pair of inner and outer rigid arcuate side members adapted to be disposed on opposite sides of a tire, and carrying a plurality of chain cross-links adapted to span the tread of the tire transversely, each set of arcuate side members comprising two sections pivotally connected at adjacent ends and terminating short of a full circle, a rigid segment having slots in its ends and engaging hooks on the free ends of said inner set of side members for connecting said inner set of side members, and a resilient link for connecting the free ends of said outer set of side members, said segment and resilient link carrying no chain cross-links.

6. A tire chain device comprising a pair of inner and outer rigid arcuate side members adapted to be disposed on opposite sides of a tire, and carrying a plurality of chain cross-links adapted to span the tread of the tire transversely, each set of arcuate side members comprising two sections pivotally connected at adjacent ends and terminating short of a full circle, a rigid segment having slots in its ends and engaging hooks on the free ends of said inner set of side members for connecting said inner set of side members, and a detachable resilient link for connecting the free ends of said outer set of said members, said segment and resilient link carrying no chain cross-links.

7. A tire chain device comprising a pair of inner and outer rigid arcuate side members adapted to be disposed on opposite sides of a tire, and carrying a plurality of chain cross-links adapted to span the tread of the tire transversely, each set of arcuate side members comprising two sections pivotally connected at adjacent ends and terminating short of a full circle, a rigid segment having slots in its ends and engaging hooks on the free ends of said inner set of side members, and a detachable resilient link having snap fasteners at its ends for connecting the free ends of said outer set of side members, said segment and resilient link carrying no chain cross-links.

8. A tire chain device comprising a pair of inner and outer rigid arcuate side members adapted to be disposed on opposite sides of a tire, and carrying a plurality of chain cross-links adapted to span the tread of the tire transversely, each set of arcuate side members comprising two sections pivotally connected at adjacent ends and terminating short of a full circle, a rigid arcuate segment having slots in its ends and engaging hooks on the free ends of said inner set of side members, and a detachable resilient link having snap fasteners at its ends for connecting the free ends of said outer set of side members, said segment and resilient link carrying no chain cross-links.

9. A tire chain device comprising a pair of inner and outer rigid arcuate side members adapted to be disposed on opposite sides of a tire, and carrying a plurality of chain cross-links adapted to span the tread of the tire transversely, each set of arcuate side members comprising two sections pivotally connected at adjacent ends and terminating short of a full circle, a rigid segment for connecting the free ends of said inner set of side members, and a detachable toggle joint link for resiliently connecting the free ends of said outer set of side members, said segment and resilient link carrying no chain cross-links.

10. A tire chain device comprising a pair of inner and outer rigid arcuate side members adapted to be disposed on the opposite sides of the tire and carrying a plurality of sets of chain cross-links equidistantly spaced about the circumference of said tire and spanning the tread of the tire transversely, each set of arcuate side members comprising two sections pivotally connected at adjacent ends and terminating short of a full circle, a third rigid segment for connecting the free ends of said inner set of side members, and a resilient link for connecting the free ends of said outer set of side members, said third segment and resilient link carrying no chain cross-links.

11. A tire chain device comprising a pair of inner and outer rigid arcuate side members adapted to be disposed on the opposite sides of a tire, and carrying a plurality of sets of chain cross-links spaced at the quarter positions about the circumference of said tire and spanning the tread of the tire transversely, each set of arcuate side members comprising two sections pivotally connected at the adjacent ends and terminating short of a full circle, a detachable rigid segment for connecting the free ends of said inner set of side members and a resilient link for connecting the free ends of said outer set of side members, said segment and resilient link being free of chain cross-links.

12. A tire chain device comprising a pair of inner and outer rigid arcuate side members adapted to be disposed on the opposite sides of the tire, and carrying a plurality of sets of chain cross-links spaced equidistantly about the circumference of said tire and spanning the tread of the tire transversely, each set of arcuate side members comprising two sections pivotally connected at adjacent ends and terminating short of a full circle, a detachable rigid segment for connecting the free ends of said inner set of side members and a detachable resilient link for connecting the free ends of said outer set of side members, said detachable segment and link carrying no chain cross-links.

ROBERT E. JACKSON.

References Cited in the file of this patent

UNITED STATES PATENTS

| Number | Name | Date |
| --- | --- | --- |
| 1,248,212 | Walden | Nov. 27, 1917 |
| 1,370,293 | Dowell | Mar. 1, 1921 |
| 1,511,685 | Spiro | Oct. 14, 1924 |
| 2,176,637 | Miller | Oct. 17, 1939 |
| 2,328,808 | Holtz | Sept. 7, 1943 |
| 2,429,738 | Zimmer | Oct. 28, 1947 |
| 2,469,235 | Lindenthaler | May 3, 1949 |
| 2,505,102 | Davis | Apr. 25, 1950 |